United States Patent
Cole et al.

(10) Patent No.: US 9,946,750 B2
(45) Date of Patent: Apr. 17, 2018

(54) ESTIMATING STATISTICS FOR GENERATING EXECUTION PLANS FOR DATABASE QUERIES

(71) Applicant: ParAccel LLC, Campbell, CA (US)

(72) Inventors: Richard L. Cole, Los Gatos, CA (US); Sergei Perfilov, San Jose, CA (US)

(73) Assignee: Actian Corporation, Palo Alto, CA (US)

( * ) Notice: Subject to any disclaimer, the term of this patent is extended or adjusted under 35 U.S.C. 154(b) by 587 days.

(21) Appl. No.: 14/474,682

(22) Filed: Sep. 2, 2014

(65) Prior Publication Data

US 2015/0154255 A1 Jun. 4, 2015

Related U.S. Application Data

(60) Provisional application No. 61/910,381, filed on Dec. 1, 2013.

(51) Int. Cl.
G06F 17/30 (2006.01)

(52) U.S. Cl.
CPC .............................. *G06F 17/30463* (2013.01)

(58) Field of Classification Search
CPC ................................................ G06F 17/30463
See application file for complete search history.

(56) References Cited

U.S. PATENT DOCUMENTS

| | | | | |
|---|---|---|---|---|
| 5,608,904 A * | 3/1997 | Chaudhuri | ........ | G06F 17/30471 |
| 9,471,631 B2 * | 10/2016 | Chakkappen | ..... | G06F 17/30466 |
| 2006/0230016 A1 * | 10/2006 | Cunningham | .... | G06F 17/30474 |
| 2007/0130107 A1 * | 6/2007 | Waas | ................. | G06F 17/30312 |
| 2009/0077016 A1 * | 3/2009 | Belknap | ............ | G06F 17/30306 |
| 2010/0030728 A1 * | 2/2010 | Chakkappen | ..... | G06F 17/30469 707/713 |
| 2010/0153431 A1 * | 6/2010 | Burger | .............. | G06F 17/30536 707/769 |

OTHER PUBLICATIONS

Thiyagarajah, Attribute Cardinality Maps: New Query Result Size Estimation Techniques for Database Systems, May 1999, 281 pages.*

(Continued)

*Primary Examiner* — Albert M Phillips, III
(74) *Attorney, Agent, or Firm* — Fenwick & West LLP (57) ABSTRACT

A database system identifies missing statistics that is not available for processing database queries and determines the missing statistics. The database system generates execution plans for database queries. The database system requests certain statistical information for generating a database query. If the database system determines that the requested statistical information is not available, the database system stores information describing the requested statistical information as missing statistics. The missing statistics may identify one or more columns associated with tables processed by the database query. The database system performs statistical analysis of database tables to generate the missing statistics so that the statistical information is available for generating execution plans for subsequent queries. The database system may rank the missing statistics based on the number of times the missing statistics was identified by the database system while processing database queries.

20 Claims, 4 Drawing Sheets

(56) References Cited

OTHER PUBLICATIONS

Bar-Yossef, Z. et al., "Counting Distinct Elements in a Data Stream," In Proc. RANDOM, LNCS 2483, 2002, pp. 1-10.

Beyer, K. et al., "Distinct-Value Synopses for Multiset Operations," Communications of the ACM, Oct. 2009, pp. 87-95, vol. 52, No. 10.

Beyer, K. et al., "On Synopses for Distinct-Value Estimation Under Multiset Operations," In Proc. ACM SIGMOD, Jun. 12-14, 2007, pp. 199-210.

Charikar, M. et al., "Towards Estimation Error Guarantees for Distinct Values," In Proc. ACM PODS, 2000. pp. 268-279.

Chaudhuri, S. et al., "Random Sampling for Histogram Construction: How Much is Enough?" In Proc. ACM SIGMOD, 1998, pp. 436-447.

Durand, M. et al., "Loglog Counting of Large Cardinalities," Di Battista et al. (Eds.), ESA 2003, LNCS 2832, 2003, pp. 605-617.

Flajolet, P. et al., "Probabilistic Counting Algorithms for Data Base Applications," In J. of Computer and System Sciences, 1985, pp. 182-209, v.31.

Gibbons, P. B., "Distinct Sampling for Highly-Accurate Answers to Distinct Values Queries and Event Reports," In Proc. Very Large Data Bases, Sep. 11-14, 2001, pp. 541-550.

Haas, P. et al., "Estimating the Number of Classes in a Finite Population," in IBM Research Report RJ 10025 (90521), May 29, 1996, 45 pages.

Haas, P. et al., "Sampling-Based Estimation of the Number of Distinct Values of an Attribute," In Proc. Very Large Data Bases, Sep. 11-15, 1995, pp. 331-322.

\* cited by examiner

ESTIMATING STATISTICS FOR GENERATING EXECUTION PLANS FOR DATABASE QUERIES

CROSS REFERENCE TO RELATED APPLICATION

This application claims the benefit of U.S. Provisional Application No. 61/910,381 filed on Dec. 1, 2013, which is incorporated by reference in its entirety.

BACKGROUND

Databases store large amount of data that is processed in response to database queries. Typically databases generate an execution plan for the queries. The execution plan comprises various operators and order of execution of these operators so as to execute a database query. A database query optimizer typically evaluates several execution plans to select a particular query plan for execution. The query optimizer selects the query plan that the optimizer estimates as the best query plan for executing the database query.

Generating the optimal query plan is a complex process that can take significant amount of time depending on the complexity of a query. Query optimizers use statistics describing tables used in queries to determine an execution plan for the query. If the query optimizer does not have statistics describing a table used in a query, the optimizer is likely to select a suboptimal/inferior execution plan.

SUMMARY

Embodiments of the invention allow a database system to identify missing statistics and generate it for optimizing database queries. The database system generates execution plan for database queries received. The database system identifies a type of statistical information associated with one or more columns useful for generating the execution plan. The database system identifies that the statistical information is not available. The database system stores information describing the statistical information identified as missing statistics. The database system performs statistical analysis of tables associated with missing statistics to estimate values for the missing statistics. The values of the missing statistics estimated can be used for generation of execution plans for database queries received subsequently.

In an embodiment, the database system ranks the missing statistics based on the number of times the database system identified the corresponding statistical information as missing while generating execution plans for database queries.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Databases allow users to interact with the data stored in the database using a query language, for example, the structured query language (SQL) interface. A typical database query language allows users to execute statements that can access and manipulate data from the database. A query optimizer generates execution plan for the database queries for execution. The query optimizer enumerates several plans choices and evaluates these plan choices to select an execution plan for executing the query.

The query optimizer uses statistics describing tables used in queries to evaluate each execution plan. The database system typically stores statistics describing the tables stored in the database. The statistics includes different types of information describing database tables, for example, the size of the tables in terms of number of rows, sizes of data stored in the rows, distribution of data, and so on. The query optimizer of the database system uses the table statistics to make decisions regarding selection of an execution plan for executing the queries.

Specific types of statistical information allow the optimizer to make specific choices in evaluating an execution plan. For example, the cardinality of a table may allow the optimizer to determine the order in which that table is joined with other tables. If a particular type of statistical information describing one or more tables is not available, the optimizer may make incorrect decisions while generating the execution plan of a query. These incorrect decisions correspond to specific portions of the execution plan that the optimizer would have optimized based on the information that was not available. The incorrect decision may also correspond to choices regarding how various portions of the execution plan are combined together. As a result, the incorrect decision affects the overall execution plan and may result in an inefficient execution plan.

An example of a type of statistics used by a query optimizer include the number of distinct values (NDVs) of a single column or a tuple from an input table of a query, intermediate results or final results of a query or subquery. A query optimizer uses estimates of NDV to estimate selectivity of local predicates, joins, aggregation, and uniqueness for "distinct" operations. The query optimizer uses measures of selectivity for choosing a good join order by minimizing execution plan cost according to a cost model. For example, queries often process multiple columns of the same table or columns from different tables. Optimizing such queries may require use of multi-column NDV statistics. For example, a database query may filter columns based on an expression based on columns c1 and c2 of a table t1. If the multi-column NDV statistics for columns c1 and c2 are available, the query optimizer can use the statistics for making decisions when generating the execution plan for the database query.

However, for tables with a large number of columns, the number of combinations of columns can be very large, thereby requiring a large number of distinct multi-column statistics values. For example, if a table has 10 columns, the optimizer may have to compute combinations of two columns, combinations of three columns, combinations of four columns, and so on. Several of these statistics values may never be used for optimizing queries if the queries received by the database system do not process those combinations of columns. Embodiments allow the database system to determine, multi-column statistics for determining which combinations of columns are most likely to be helpful in query processing.

Embodiments analyze a given workload for the database system comprising queries to the database system. These queries may be queries that an application plans to execute on the database system or queries that are being executed on the database system. The database system analyzes these queries generate execution plans. The optimizer also generates information describing the different types of statistics that the optimizer could have used for determining the execution plan for each query if the corresponding statistics was available. The database system stores (for example, in logs) information describing the different types of statistical information that the optimizer could have used for making certain decisions if the information was available. These logs are analyzed to identify and prioritize tasks for generating statistical information for various tables and columns of the database.

For example, the database system receives a query q1 that selects rows from a table t1 using an expression based on columns c1 and c2. The query optimizer requests multi-column NDV statistics describing columns c1 and c2 of table t1 to generate the execution plan. The query optimizer determines that the requested multi-column NDV statistics is not available in the database system. The query optimizer stores information indicating that the query optimizer could have used information describing multi-column NDV statistics based on columns c1 and c2 of table t1. In an embodiment, the optimizer logs the information describing statistics that the optimizer could have used for specific queries if the information was available. The statistics that the optimizer could have used if available is referred to herein as missing statistics. The logs generated by the query optimizer may be stored in database tables. The information stored in these logs can be used to determine which missing statistics should be generated. The database prioritizes the different types of missing statistics that the database system should generate.

Parallel Database System

In an embodiment, the database system is a parallel database system that utilizes multiple processors. A parallel database system can process queries that process large amount of data by distributing the processing among different processors. However, embodiments described herein are not limited to parallel database architectures and can be used for single processor database architectures also.

Figure 1:
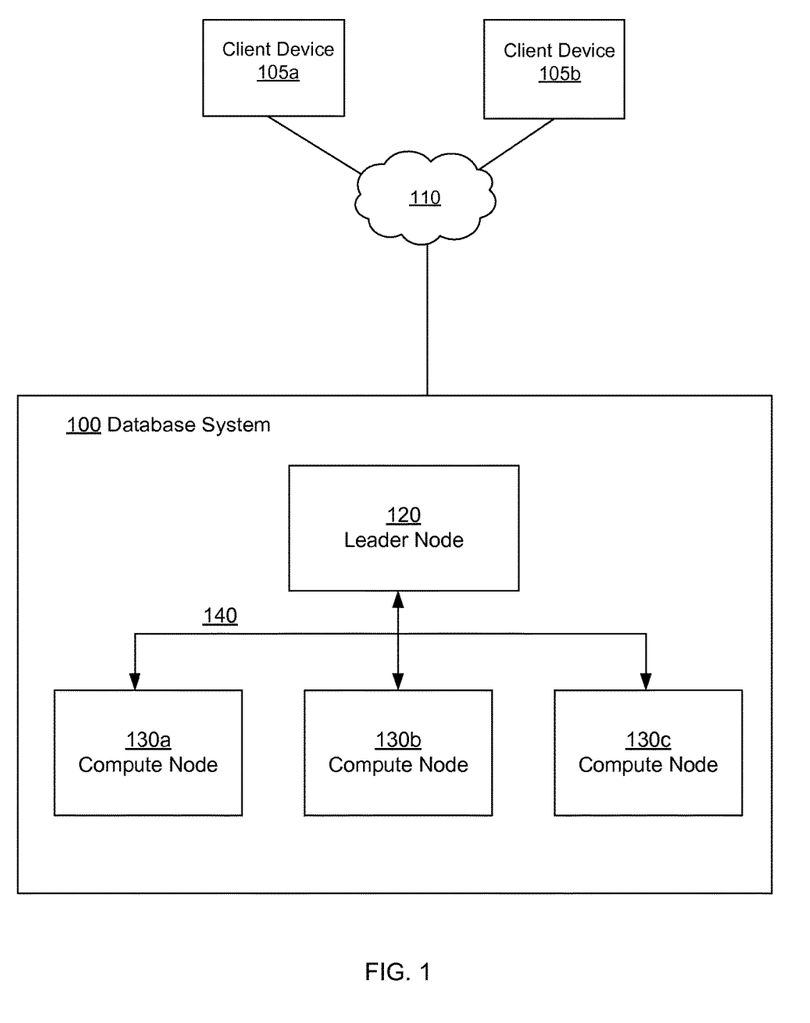
FIG. 1 shows the architecture of a parallel database system, in accordance with an embodiment of the invention.

FIG. 1 shows the overall system environment illustrating the architecture of a database system 100, in accordance with an embodiment of the invention. The database system 100 has four main architectural components: a leader node 120, one or more compute nodes 130, a parallel communication fabric 140, and an optional storage area network (SAN) (not shown in FIG. 1). (A letter after a reference numeral, such as "130a," indicates that the text refers specifically to the element having that particular reference numeral, while a reference numeral in the text without a following letter, such as "130," refers to any or all of the elements in the figures bearing that reference numeral.)

The leader node 120 controls the execution of the compute nodes 130. All nodes 120, 130 communicate with each other via the parallel communication fabric 140. The leader node 120 and the compute nodes 130 can comprise any type of processor, for example, standard x86 servers running Linux or multi-core systems. Users and applications may communicate with the system via the leader node by using standard interfaces, ANSI SQL via ODBC/JDBC (in general, "the system" or "database system" or "database" refers to a parallel database system 100 herein.)

The leader node 120 may be connected to the network 110 and may interface with external applications and other computers using the network. A leader node manages communications with the compute nodes. In an embodiment, the leader node controls sessions, parsing and optimizing queries, and scheduling execution of the workload. The leader node may or may not participate in data operations. The leader node may be optimized for outward communication and handling of query overhead so the resources of the compute nodes are utilized for performing data operations.

Compute nodes 130 are the components of the parallel database system 100 that perform processing and storing of data. Each compute node 130 stores and manages a subset of rows of each table. For example, if a table has 1 billion rows and there are 20 compute nodes, then approximately 50 million rows are distributed to each compute node 130.

Data may be distributed to a particular compute node 130 based on a particular data distribution strategy, for example, based on a hashing algorithm applied to a distribution key, or by round robin. Distribution keys, such as the primary key or other popular join column may be used for even distribution of data, especially when queries are likely to benefit from collocated joins by using the same distribution key. In cases where an inherently balanced distribution key isn't obvious or doesn't exist, round robin distribution may be used to balance the data.

Client devices 105 are computing devices that execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interact with a database system.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the parallel database system 100 are typically performed via a network 110, for example, via the internet. The network 110 enables communications between the client device 105 and the parallel database system 100. In one embodiment, the network 110 uses standard communications technologies and/or protocols. In another embodiment, the entities can use custom and/or dedicated data communications technologies instead of, or in addition to, the ones described above.

Depending upon the embodiment, the network 110 can also include links to other networks such as the Internet.

System Architecture

Figure 2:
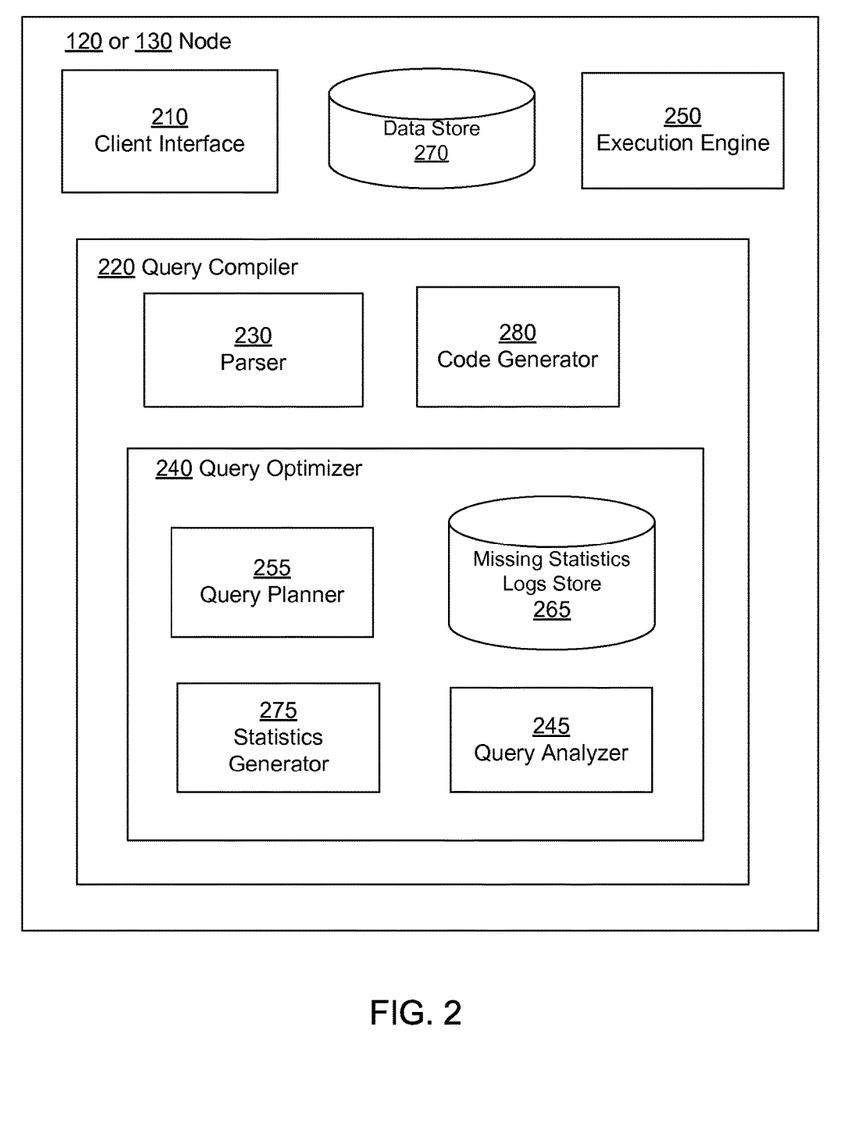
FIG. 2 shows a high level view of internal components and functionality provided by parallel database system, in accordance with an embodiment.

FIG. 2 is a high level block diagram illustrating the system architecture of a node 120, 130 of the parallel database system, for example the leader node 120 or the compute node 130, in accordance with an embodiment. The compute nodes implement a set of processes that manage communication with the leader node to receive commands, send back data, and route compiled code to individual query processes to execute for a given query.

The node 120 or 130 comprises a client interface 210, a query compiler 220, an execution engine 250, and a data store 270. In alternative configurations, different and/or additional modules may be included in the system. The client interface 210 allows a node to interact with client devices 105. Typically the leader node 120 interacts with client devices 105. However compute nodes 130 may interact with external systems, for example, to import or export data. When a new client request comes in to perform a query or some other type of database operation, the system of node 120 spawns a new process to maintain session information for that client. That process is maintained as long as the client session remains open and that client is sending query requests to the leader node 120.

The data store 270 stores the data on a persistent storage, for example, a disk. This data includes relations or tables comprising rows and columns of user data. The query compiler 220 compiles each query to generate a plan for execution of the query and performs any optimizations needed. The query compiler 220 comprises components including a query parser 230, a query optimizer 240, and a code generator 280. The query parser 230 parses an input query to ensure that there are no syntax errors in the query. If a well formed query is provided to the system 120, the query parser 230 builds appropriate data structures to perform further processing of the query, for example, query optimization or code generation. The query optimizer 240 performs optimizations to ensure that a query runs efficiently and generates an execution plan for the query. The code generator 280 generates the code corresponding to an execution plan for a query.

In an embodiment, the query optimizer 240 comprises components including a query planner 255, statistics generator 275, missing statistics logs store 265, and query analyzer 245. The query analyzer 245 analyzes queries received as part of a workload and identifies missing statistics. The statistics generator 275 estimates different types of statistics describing tables and columns of tables. The statistics generator 275 runs the process of estimating missing statistics values in parallel on compute nodes, saves intermediate results in memory, then merges intermediate results on the leader. In an embodiment, information about missing statistics is kept on each portion of data stored on a compute node, for example, a slice. This information may be used to estimate the size of hash table for hash joins and aggregation for each slice.

The query planner 255 generates a query plan for executing a query. The query planner 255 uses the statistics generated by the statistics generator 275 to determine execution plans for queries. The missing statistics logs store 265 stores information describing the missing statistics that the query optimizer 240 could have used if available. In an embodiment, the missing statistics logs store 265 stores information in database tables. The database schema for storing the missing statistics logs stores data in a format that allows the information to be joined with other types of information.

In one embodiment, a database table or data store is used to store information describing missing statistics including a query identifier, a sequence number of for the missing statistics, a table identifier for the table for which statistics is missing and a type of use case for which the query planner could have used the missing statistics. Examples of types of use case include "plocal" for local predicates, "pjoin" for join predicates, "groups" for queries grouping or computing distinct vales of results. The query identifier and the sequence number form a primary key for the database table. Another database table or data store is used for storing columns that are related to missing statistics. The table storing column information may include the query identifier, the sequence number of the missing statistics information, and a column identifier that uniquely identifies the column. These two database tables can be joined with each other and with other database tables to generate other types of information. For example, a view can be generated that lists all columns associated with a missing multi-column NDV statistic.

The tables belonging to the missing statistics logs store 265 can be used to create a view or another table that stores other information including a reference count representing the number of times that a particular missing NDV statistics for a given set of columns were identified by the query planner as being useful for planning queries. The statistics generator 275 may use the reference count to prioritize the missing statistics. For example, missing statistics having higher reference counts may be given higher priority for generation. The statistics generator 275 may rank the missing statistics by descending order of the reference count, and use the result to determine the priority of generation of the missing statistics.

The statistics generator 275 may use various criteria for determining priorities for generating statistics. In an embodiment, the statistics generator 275 joins the tables storing the missing statistics information with other tables to select a subset of missing statistics for ranking. The statistics generator 275 may determine a subset of missing statistics that was identified as missing by the planner for queries processed by a particular application. The statistics generator 275 may determine a subset of missing statistics that was identified as missing by the planner for queries that take longer than a threshold time for execution, for example, to process slow queries. The statistics generator 275 may determine a subset of missing statistics for ranking that was identified as missing by the query planner for queries processed during a particular time window or queries processed during a time window that occurs periodically, for example, every day. The statistics generator 275 may determine a subset of missing statistics for ranking that was identified as missing by the query planner for queries executed buy a particular user.

The following table shows an example data set that may either be stored in the missing statistics logs store 265 or may be obtained by joining information stored in the missing statistics logs store 265 with other tables in the database.

| Query Identifier | Sequence | Usage Type | Table Name | Column Name |
|---|---|---|---|---|
| 1376087766 | 1 | GROUPS | imp_click | buy_purchase_id |
| 1376087766 | 1 | GROUPS | imp_click | click_date_id |

| Query Identifier | Sequence | Usage Type | Table Name | Column Name |
|---|---|---|---|---|
| 1376087766 | 1 | GROUPS | imp_click | creative_combo_id |
| 1376087766 | 1 | GROUPS | imp_click | campaign_id |

The column of the above table with heading "query identifier" stores a value that uniquely identifies the query. The query identifier may be used to join the above information with query related information that may be stored in other tables. The sequence number is an identifier for the missing statistics. The table name and column name identify the columns for which the multi-column statistics needs to be generated. As shown in the above table, the four columns all belong to the same table imp_click. The usage type is a value that identifies the type of usage for which the planner attempted to use the missing statistics, indicating that the missing statistics in the above table was encountered by the planner for a query that performed grouping of results by the four columns listed in the above table.

In an embodiment, a view based on the above data set may be created or queries executed to generate commands that can be executed to generate the required statistics. Example results of inspecting data of this view or result of executing these queries are as follows.

| Table Name | Column Names | Reference Count | Command |
|---|---|---|---|
| adws_imp_click | (buy_purchase_id, click_date_id, cmpgn_id, creative_combo_id) | 1 | ANALYZE KMV adws_imp_click (buy_purchase_id, click_date_id, cmpgn_id, creative_combo_id); |

Accordingly, queries can be executed to generate data in a form in which it can be readily used by a user or by the system. The column names column generates a string using the columns of the multi-column statistics that was determined to be missing. The reference count value counts the number of times this NDV statistics for a particular set of columns were thought to be useful during query planning. The command is a command that can be executed to generate the missing statistics. For example, the command name is ANALYZE and the parameters KMV qualifies the mechanism used for statistics generation, the table name specified in the command is adws_imp_click followed by all the columns for which the multi-column statistics needs to be generated. This command can be manually executed by a system or automatically executed by the database system, for example, periodically to generate the required statistics.

Execution of a Query in the Parallel Database System

The following steps detail the high-level operations that take place in processing a client request from its initial creation to sending results or status back to the client, to complete the request. After creating a process to maintain the connection with a new client, the system 100 routes the requested operation (a SQL query or some other database operation) through the parser and optimizer to develop a query execution plan to perform or execute the specified query or database operation.

Figure 3:
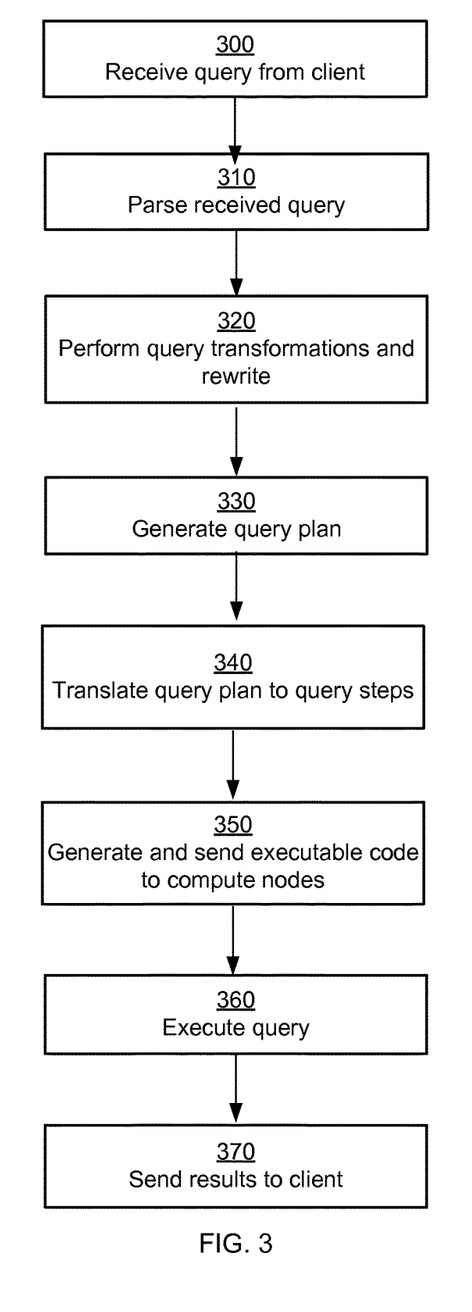
FIG. 3 shows a flowchart for illustrating the processing of a query in the parallel database, in accordance with an embodiment.

FIG. 3 shows a flowchart for illustrating the processing of a query in the parallel database, in accordance with an embodiment. These steps may be performed in orders other than those shown in FIG. 3. Furthermore, each step of the flowchart can be performed by modules different from those indicated below.

The leader node 120 receives 300 a database query from a client 105, for example, an SQL query. The query parser 230 parses 310 the query received to generate a data structure representing the query. The query optimizer 240 performs 320 various transformations on the query, for example, by rewriting the query. The query planner 255 generates 330 a physical query plan for the input query. The physical query plan may specify execution choices, such as join type, join order, aggregation options, and data distribution requirements. The execution engine 250 translates 340 the physical plan into sequences of query steps. The execution engine 250 generates 350 and sends executable code to various compute nodes.

Each compute node executes 360 the query for the portion of data present on the compute node. Each compute node may be considered divided into slices, typically one slice per core or processor. Each slice is associated with a portion of data that is processed by the slice. The slices on each node share the server's memory and disk space to parallelize the workload for a query or other database operation sent to all the compute node servers. Each compute node 130 includes a communication layer for communicating, for example, with the leader node and a dispatcher that assigns a particular query task to corresponding slice query processes available to perform queries within each compute node. Each slice can have a pool of separate processes that can independently run compiled query code for a slice of data associated with a query task or other database operation. Additional leader and compute node communication processes handle the transfer of commands and data back and forth between the leader node 120 and compute nodes 130 associated with the execution of specific query tasks. The compute nodes determine the result of execution of the query and communicate the result to the leader node. The leader node receives the results and sends 370 the results to the client that sent the query.

Overall Process for Prioritizing Statistics Estimation

Figure 4:
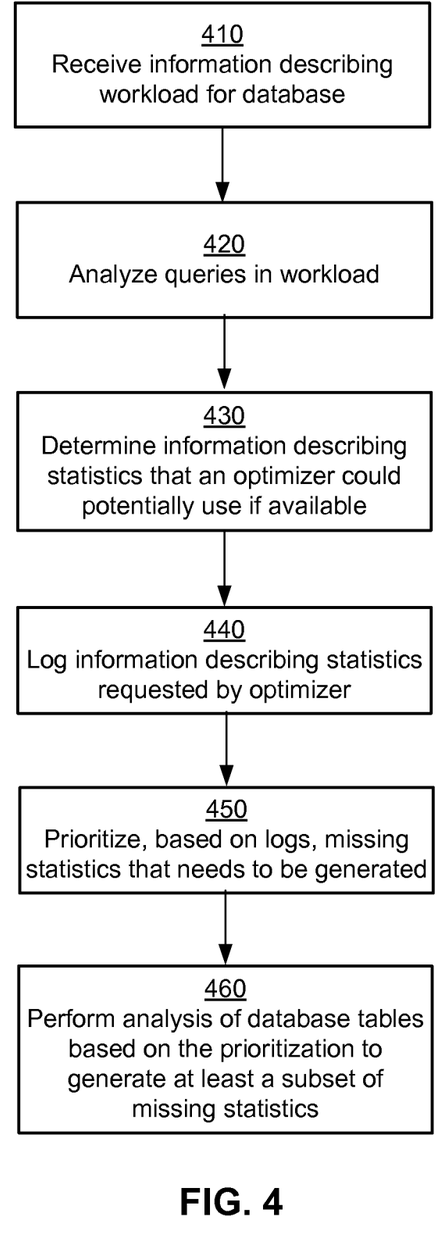
FIG. 4 shows a flowchart for illustrating the process of generating statistics for a given workload, in accordance with an embodiment.

FIG. 4 shows a flowchart for illustrating the process of generating statistics for a given workload, in accordance with an embodiment. The query analyzer 245 receives 410 information describing a workload for analysis. The workload may comprise a set of database queries received for execution by the database system. For example, the workload may be specified as one or more scripts storing database queries for execution by the database system. Alternatively, the workload may comprise database queries received by the database system for execution, for example, as requests received by an online system.

The query analyzer 245 analyzes 420 the database queries to determine 430 if there is statistical information associated with each query that the query optimizer could use if available. The query analyzer 245 selects a query for analysis. The query analyzer 245 sends the selected query to the query planner 255 for generating an execution plan for the database query. The query planner 255 evaluates several execution plans to select a particular execution plan for the query. The query planner 255 uses different types of statistical information to determine portions of the execution plan. The query planner determines one or more types of statistical information for making decisions during optimization of the query and requests the statistical information, for example, from a statistics store (not shown in FIG. 2) storing metadata describing different types of statistics.

For example, the execution plan may comprise several operators and an order of execution of the operators. The query planner 255 may use specific type of statistical information to select a type of operator for executing certain step of the query or attributes of a particular operator. The query planner 255 may use specific type of statistical information to determine the order in which data is processed, for example, the order in which tables may be joined by the query.

In an embodiment, the statistical information identifies one or more columns of database tables. For example, the statistical information may describe the number of distinct values of one or more columns. The one or more columns may belong to the same table or to different tables. In other words, the query planner 255 uses statistical information to make decisions related to the determining the execution plan by finalizing portions of the execution plan.

If the query planner 255 determines 430 that a particular type of statistical information that the query planner 255 needs for making a particular decision related to the execution plan is not available, the query planner logs 440 information describing the type of statistical information that was not available in the missing statistics logs store 265. The information logged by the query planner 255 may include the names of columns and corresponding tables for which the statistical information was determined to be not available. The information logged may identify the type of usage of the query for which the statistical information would have been used by the query planner 255. For example, the type of usage may indicate that the query performed a "group by" operation for grouping the values using one or more columns. Alternatively, the type of usage may indicate whether the statistical information was needed for analyzing a filter operation based on values of one or more columns. The information logged specifies the columns associated with the usage information.

The statistics generator 275 analyzes the information stored in the missing statistics logs store 265 to prioritize 450 the generation of statistics for specific tables and columns. For example, the statistics generator 275 determines the number of times a particular type of statistical information was logged. For example, assume that a very large number of queries of a workload, filter data based on values from a set of columns. Accordingly, the multi-column NDV statistics for the set of columns gets logged a large number of times on the missing statistics logs store 265.

The statistics generator 275 ranks the statistical information stored in the logs based on certain criteria including the number of times each type of statistical information was logged. The ranking of the statistical information that needs to be generated allows the statistics generator 275 to prioritize 450 the generation of statistics. The statistics generator 275 performs 460 statistical analysis of tables of the database based on the ranking to generate statistical information. For example, the statistics generator 275 gives higher priority to statistical information that ranks high based on the above criteria. In an embodiment, the multi-column NDV values are generated in parallel for a given set of columns for a table.

In an embodiment, the database system 100 automatically schedules tasks that periodically analyze data available in the missing statistics logs store 265 to prioritize the determination of the missing statistics. The database system 100 schedules another task for determining the missing statistics as prioritized based on the analysis of missing statistics. Once the multi-column statistics for a set of columns is determined, the statistics value is available for the query planner 255 to use. Accordingly, the query planner 255 stops logging the corresponding multi-column statistics in the missing statistics logs store 265, since the statistics is available and not missing.

A particular type of statistics generated by the statistics generator 275 is NDV of single or multiple columns. In one embodiment, the statistics generator 275 performs samples of the table being analyzed to get an estimate of the NDV for a set of columns. In an embodiment, the sample size is assumed to be square root of the number of rows of the table being analyzed. In another embodiment, the sample size of square root of the number of rows is used if the number of rows of the table is above a predefined threshold value (referred to as the sampling threshold value). If the number of rows of the table is below the threshold value, the entire set of rows is used instead of a sample. For large tables, a sample based statistics estimation results in inaccurate results leading to incorrect cardinality estimations which in turn results in generation of suboptimal execution plans. Embodiments that perform statistics estimation using a parallel architecture that utilizes multiple processors determine the required statistics more efficiently whether they use the sampling based approach or use the approach based on feedback from the optimizer for missing statistics.

In an embodiment, the sample size depends on whether the column is a distribution key or not. A column of a table may be identified as the distribution key. The data values in the column defined as the distribution key determine the distribution of data across slices. Matching values from the distribution key column are stored together. A hashing function is used to determine the distribution of the rows among slices. If a column is not a distribution key, the sample size is determined as the minimum of square root of the number of rows of the table and the sampling threshold value. This can be expressed as (min(sqrt(num_rows), sample_threshold), where min is a function that computes minimum of the input values, sqrt is a function that computes square root of the input value, num_rows is the number of rows and sample_threshold is the sampling threshold value.

If the column is a distribution key, the sample size is determined by computing the square root of the product of the number of rows and the number of slices and determining the minimum of the square root value and the sampling threshold value. This can be expressed as the expression (min(sqrt(num_rows*num_slices), stat_sample_threshold) where num_slices is the number of slices and the remaining variables are as described above.

In another embodiment, statistics generator 275 determines accurate NDV estimates by processing all rows of the table by performing a full table scan instead of processing a sample. Some embodiments store the database in columnar fashion where data blocks of a column are stored together. In these embodiments based on columnar representation of table data, the NDV estimates may not require a full table scan. Instead data for a particular column can be scanned independent of other columns. Alternatively, the statistics generator 275 determines NDV estimates by processing a large subset of rows of the table, for example a larger subset compared to that discussed above for a sampling based process. Since processing all rows of a large table can be a computation intensive process, the rows are processed in parallel, if the database system is executed on a parallel architecture. The query planner 255 uses estimates of NDV for determining selectivity in various contexts. For example, the query planner 255 may use NDV estimates for determining selectivity for local predicates, for equijoin predicates, or for number of groups for aggregation.

If there are local predicates on two or more columns of the same table then selectivity of predicates is determined by using multi-column NDVs for the two or more columns used in the predicates. For example, if a query specifies predicates on two columns "col1=k1" and "col2=k2", where k1 and k2 are constants, and NDV values of col1 and col2 are NDV1 and NDV2 respectively, the selectivity may be estimated to be inversely proportionate to the product of the NDV values of the two columns, i.e., 1/(NDV1*NDV2). However, if the two columns are dependent, the selectivity estimate based on inverse of products of NDV values may be inaccurate since it would provide a lower estimate compared to the accurate selectivity. Embodiments determine selectivity based on multi-column NDV value NDV1_2 that provides an estimate of number of distinct value pairs (col1, col2). Accordingly, the selectivity for the predicates on two columns is determined to be proportional to 1/NDV1_2. If the multicolumn NDV statistics are not available, the query planner 255 logs the information describing the corresponding missing statistics in the missing statistics logs store 265.

In general if a query specifies predicates on a plurality of columns, col1, col2, col3, . . . , and colN, query planner 255 uses a multi-column NDV value NDV1_2_3_N, for tuples of values from the plurality of columns, for example, (val1, val2, val3, . . . , valN) where val1 represents values from col1, val2 represents values from col2, val3 represents values from col3, and so on. Accordingly, the selectivity for the predicates on N columns is determined to be proportional to 1/NDV1_2_3_N. In general, the more number of columns are involved in single table local predicates the better cardinality estimation is obtained when using multi column NDVs as compared to single column NDVs. If the multicolumn NDV statistics is not available, the query planner 255 logs the information describing the corresponding missing statistics in the missing statistics logs store 265.

The query planner 255 uses the statistics generated by the statistics generator 275, for example, multi-column NDV to estimating selectivity of equijoin predicates, for example, "col1=col2", where col1 and col2 are columns of the same or two different tables. If nd1 and nd2 are NDVs for columns col1 and col2, estimated selectivity may be determined as a value proportional to 1/max(nd1,nd2).

The estimated selectivity based on 1/max(nd1,nd2) is likely to be underestimated, particularly if the values of nd1 and/or nd2 are overestimated. For example, the values of nd1 and/or nd2 may get overestimated if the NDVs are estimated based on sample data set from the corresponding tables, and the sample size is small. If the selectivity of the equijoin predicate is underestimated, the execution plan generated for the query is likely to be suboptimal. For example, an intermediate result obtained from an equijoin may be used as inner child of parent hash join if the selectivity of the equijoin is underestimated. This is likely to result in the query plan being inefficient.

The query planner 255 can use multicolumn NDV statistics if available for the columns on both sides of the equijoin. For example, if a query specifies a join condition that joins a plurality of tables using a plurality of columns from each table, the query planner 255 can optimize the query using the multicolumn NDV statistics (if available) for each plurality of columns corresponding to each table. As an example, if the join condition is (t1.a1=t2.a2 and t1.b1=t2.b2), the query planner 255 can use multicolumn NDV for columns (a1, b1) of table t1 and multicolumn NDV for columns (a2, b2) of table t2, if these values are available. If the multicolumn NDV statistics is not available, the query planner 255 logs the information describing the corresponding missing statistics in the missing statistics logs store 265. If NDVa1b1 and NDV a2b2 are NDV estimates for both sides of the join, the selectivity is determined to be proportional to 1/max (NDVa1b1,NDVa2b2) similar to the formula for single column join.

The query planner 255 uses the statistics generated by the statistics generator 275, for example, multi-column NDV to determine execution plans for queries that perform grouping by one or more columns. Queries may perform grouping by columns by using "group by" clause of SQL or DISTINCT clause in a SELECT list. If a query includes a subquery that performs "group by" or distinct operations, the query planner may use an estimate of the number of rows returned by the subquery to determine the query plan.

For the above examples, including local predicates, equijoin predicates, group by expressions, and other types of usages of multiple columns, the query planner 255 determines whether the multi-column NDV statistics helps determine the execution plan of the query is available or not. If the required multi-column NDV statistics is not available, the query planner 255 logs information describing the missing statistics in the missing statistics logs store 265. The statistics generator 275 processes the information stored in the missing statistics logs store 265 to prioritize generation of statistics.

Alternative Applications

Several embodiments are described herein using a parallel database architecture. However, other embodiments based on a single processor architecture are foreseeable. Furthermore, examples presented are based on relational databases using SQL as language interface. However, other embodiments can be described that allow prioritization of statistics for other types of database, for example, object based databases. Furthermore, the database query specification is not limited to SQL but can be any query language. Although mechanisms described herein use multi-column NDV as an example, mechanisms disclosed are applicable to other types of statistics, for example, multi-column histograms, number of rows, most common values and frequencies. In general the optimizer may log any type of missing statistics that the optimizer could have used but was not available. The database system generates the missing statistics and makes them available for the optimizer. The generation of the statistics is prioritized based on the frequency with which the statistics was encountered by the optimizer.

Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method for generating statistics for processing database queries, the method comprising:
   receiving, by a query compiler, from a client device, a plurality of database queries by a database system, the database queries processing data stored in database tables of the database system;
   identifying, by the query compiler, missing statistics while generating execution plans for database queries, the identifying comprising, for each of the plurality of database queries:
      requesting a statistical information useful for generating an execution plan for a database query; and
      determining that the requested statistical information is not available; and
      storing information describing the requested statistical information as missing statistics, responsive to determining that the requested statistical information is not available;
   ranking the identified missing statistics based on a number of times each missing statistics was identified as being not available during generation of execution plan;
   determining a subset of the identified missing statistics for use in generating execution plans for subsequent database queries, wherein determining the subset comprises selecting identified missing statistics based on the ranking;
   receiving, by the query compiler, the subsequent database queries;
   generating, by the query compiler, an execution plan for the one of the subsequent database queries using at least one of the identified missing statistics from the subset;
   executing, by an execution engine, the generated execution plan for the one of the subsequent queries to determine a result set; and
   sending the determined result set to the client device.

2. The computer-implemented method of claim 1, wherein the requested statistical information is associated with one or more columns of database tables and wherein storing information describing the requested statistical information comprises storing information identifying the one or more columns.

3. The computer-implemented method of claim 1, wherein the identified missing statistics is a multi-column number of distinct values (NDV) of a plurality of columns used in a database query.

4. The computer-implemented method of claim 1, wherein identifying the missing statistics for a database query comprises:
   determining that the database query processes a plurality of columns; and
   responsive to determining that the database query processes a plurality of columns, identifying the statistical information to be a multi-column NDV of the plurality of columns.

5. The computer-implemented method of claim 4, wherein the database query specifies a comparison of each column from the plurality of columns with a corresponding constant value.

6. The computer-implemented method of claim 4, wherein the database query specifies a grouping of results of the database query based on distinct values of the plurality of columns.

7. The computer-implemented method of claim 4, the database query specifies an equijoin operation based on columns from the plurality of columns.

8. The computer-implemented method of claim 1, wherein determining the subset of the identified missing statistics comprises selecting missing statistics that was identified as missing for queries processed by a particular application.

9. The computer-implemented method of claim 1, wherein determining the subset of the identified missing statistics comprises selecting missing statistics that was identified as missing for queries taking more than a threshold amount of time for processing.

10. The computer-implemented method of claim 1, wherein determining the subset of the identified missing statistics comprises selecting missing statistics that was identified as missing for queries executed in a given time interval.

11. The computer-implemented method of claim 1, wherein determining the subset of the identified missing statistics comprises selecting missing statistics that was identified as missing for queries associated with one of: a particular user, an application, or a work-load-management related identifier.

12. A non-transitory computer readable storage medium storing instructions thereon, the instructions for execution by a computer processor to cause the computer processor to perform:
- receiving, by a query compiler from a client device, a plurality of database queries by a database system, the database queries processing data stored in database tables of the database system;
- identifying, by the query compiler, missing statistics while generating execution plans for database queries, the identifying comprising, for each of the plurality of database queries:
  - requesting a statistical information useful for generating an execution plan for a database query;
  - determining that the requested statistical information is not available; and
  - storing information describing the requested statistical information as missing statistics, responsive to determining that the requested statistical information is not available;
- ranking the identified missing statistics based on a number of times each missing statistics was identified as being not available during generation of execution plan;
- determining a subset of the identified missing statistics for use in generating execution plans for subsequent database queries, wherein determining the subset comprises selecting identified missing statistics based on the ranking;
- receiving, by the query compiler, the subsequent database queries;
- generating, by the query compiler, an execution plan for the one of the subsequent database queries using at least one of the identified missing statistics from the subset;
- executing, by an execution engine, the generated execution plan for the one of the subsequent queries to determine a result set; and
- sending the determined result set to the client device.

13. The non-transitory computer readable storage medium of claim 12, wherein the requested statistical information is associated with one or more columns of database tables and wherein storing information describing the requested statistical information comprises storing information identifying the one or more columns.

14. The non-transitory computer readable storage medium of claim 12, wherein identifying the missing statistics for a database query comprises:
- determining that the database query processes a plurality of columns; and
- responsive to determining that the database query processes a plurality of columns, identifying the statistical information to be a multi-column NDV of the plurality of columns.

15. The non-transitory computer readable storage medium of claim 14, wherein the database query specifies a comparison of each column from the plurality of columns with a corresponding constant value.

16. The non-transitory computer readable storage medium of claim 12, wherein instructions for determining the subset of the identified missing statistics comprise instructions for selecting missing statistics that was identified as missing for database queries processed by a particular application.

17. The non-transitory computer readable storage medium of claim 12, wherein instructions for determining the subset of the identified missing statistics comprise instructions for selecting missing statistics that was identified as missing for database queries associated with one of: a particular user, an application, a time window, or a work-load-management related identifier.

18. A computer-implemented system for generating statistics for a database system, the system comprising:
- a computer processor; and
- a computer-readable storage medium storing instructions thereon, the instructions for execution by a computer processor to cause the computer processor to perform:
  - receiving, by a query compiler, from a client device, a plurality of database queries by a database system, the database queries processing data stored in database tables of the database system;
  - identifying, by the query compiler, missing statistics while generating execution plans for database queries, the identifying comprising, for each of the plurality of database queries:
    - requesting a statistical information useful for generating an execution plan for a database query;
    - determining that the requested statistical information is not available; and
    - storing information describing the requested statistical information as missing statistics, responsive to determining that the requested statistical information is not available;
  - ranking the identified missing statistics based on a number of times each missing statistics was identified as being not available during generation of execution plan;
  - determining a subset of the identified missing statistics for use in generating execution plans for subsequent database queries, wherein determining the subset comprises selecting identified missing statistics based on the ranking;
  - receiving, by the query compiler, the subsequent database queries;
  - generating, by the query compiler, an execution plan for the one of the subsequent database queries using at least one of the identified missing statistics from the subset;
  - executing, by an execution engine, the generated execution plan for the one of the subsequent queries to determine a result set; and
  - sending the determined result set to the client device.

19. The computer-implemented system of claim 18, wherein instructions for identifying the missing statistics for a database query comprise instructions for:
- determining that the database query processes a plurality of columns; and
- responsive to determining that the database query processes a plurality of columns, identifying the statistical information to be a multi-column NDV of the plurality of columns.

20. The computer-implemented system of claim 19, wherein the database query specifies a comparison of each column from the plurality of columns with a corresponding constant value.

* * * * *

UNITED STATES PATENT AND TRADEMARK OFFICE
CERTIFICATE OF CORRECTION

PATENT NO. : 9,946,750 B2  
APPLICATION NO. : 14/474682  
DATED : April 17, 2018  
INVENTOR(S) : Richard L. Cole and Sergei Perfilov Page 1 of 1

It is certified that error appears in the above-identified patent and that said Letters Patent is hereby corrected as shown below:

In the Claims

In Column 13, Claim 1, Line 68, delete "execution plan" and insert --execution plans--.

In Column 15, Claim 12, Line 23, delete "execution plan" and insert --execution plans--.

In Column 16, Claim 18, Line 33, delete "execution plan" and insert --execution plans--.

Signed and Sealed this  
Nineteenth Day of November, 2019

Andrei Iancu  
*Director of the United States Patent and Trademark Office*